(12) United States Patent
Memmen

(10) Patent No.: US 7,306,026 B2
(45) Date of Patent: Dec. 11, 2007

(54) COOLED TURBINE AIRFOILS AND METHODS OF MANUFACTURE

(75) Inventor: Robert L. Memmen, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 130 days.

(21) Appl. No.: 11/219,149

(22) Filed: Sep. 1, 2005

(65) Prior Publication Data

US 2007/0044936 A1 Mar. 1, 2007

(51) Int. Cl.
*B22C 9/04* (2006.01)
*B22C 9/10* (2006.01)

(52) U.S. Cl. .................. 164/516; 164/45; 164/361; 164/369

(58) Field of Classification Search ............ 164/34–36, 164/45, 516–519, 122.1–122, 28, 361, 369; 249/142–153, 63–64, 175–186
See application file for complete search history.

(56) References Cited

U.S. PATENT DOCUMENTS

| | | | |
|---|---|---|---|
| 3,604,884 A | 9/1971 | Olsson | |
| 4,197,443 A | 4/1980 | Sidenstick | |
| 4,819,325 A | 4/1989 | Cross et al. | |
| 4,922,076 A | 5/1990 | Cross et al. | |
| 5,296,308 A | 3/1994 | Caccavale et al. | |
| 5,382,133 A | 1/1995 | Moore et al. | |
| 5,486,093 A * | 1/1996 | Auxier et al. ............. | 416/97 R |
| 5,605,639 A | 2/1997 | Banks et al. | |
| 5,637,239 A * | 6/1997 | Adamski et al. ......... | 219/69.15 |
| 6,637,500 B2 | 10/2003 | Shah et al. | |
| 6,739,381 B2 * | 5/2004 | Esser et al. ................. | 164/137 |
| 2003/0143075 A1 * | 7/2003 | Fleck ........................ | 416/97 R |
| 2005/0098296 A1 * | 5/2005 | Beals et al. ................. | 164/369 |

* cited by examiner

*Primary Examiner*—Kuang Y. Lin
(74) *Attorney, Agent, or Firm*—Bachman & LaPointe, P.C.

(57) ABSTRACT

An investment casting pattern is formed by installing a first core to a first element of a molding die to leave a first portion of the first core protruding from the first element. After the installing, the first element is assembled with a feed core and a second element of the molding die so that the first portion contacts the feed core. A material is molded at least partially over the first core and the feed core. The first portion has one or more surface area enhancements.

14 Claims, 5 Drawing Sheets

COOLED TURBINE AIRFOILS AND METHODS OF MANUFACTURE

BACKGROUND OF THE INVENTION

The invention relates to investment casting. More particularly, the invention relates to casting of film cooling holes in gas turbine engine components.

Investment casting is a commonly used technique for forming metallic components having complex geometries, especially hollow components, and is used in the fabrication of superalloy gas turbine engine components.

Gas turbine engines are widely used in aircraft propulsion, electric power generation, ship propulsion, and pumps. In gas turbine engine applications, efficiency is a prime objective. Improved gas turbine engine efficiency can be obtained by operating at higher temperatures, however current operating temperatures in the turbine section exceed the melting points of the superalloy materials used in turbine components. Consequently, it is a general practice to provide air cooling. Cooling is typically provided by flowing relatively cool air from the compressor section of the engine through passages in the turbine components to be cooled. Such cooling comes with an associated cost in engine efficiency. Consequently, there is a strong desire to provide enhanced specific cooling, maximizing the amount of cooling benefit obtained from a given amount of cooling air. This may be obtained by the use of fine, precisely located, cooling passageway sections.

A well developed field exists regarding the investment casting of internally-cooled turbine engine parts such as blades, vanes, seals, combustors, and other components. In an exemplary process, a mold is prepared having one or more mold cavities, each having a shape generally corresponding to the part to be cast. An exemplary process for preparing the mold involves the use of one or more wax patterns of the part. The patterns are formed by molding wax over ceramic cores generally corresponding to positives of the cooling passages within the parts. In a shelling process, a ceramic shell is formed around one or more such patterns in a well known fashion. The wax may be removed such as by melting, e.g., in an autoclave. The shell may be fired to harden the shell. This leaves a mold comprising the shell having one or more part-defining compartments which, in turn, contain the ceramic core(s) defining the cooling passages. Molten alloy may then be introduced to the mold to cast the part(s). Upon cooling and solidifying of the alloy, the shell and core may be mechanically and/or chemically removed from the molded part(s). The part(s) can then be machined and/or treated in one or more stages.

The ceramic cores themselves may be formed by molding a mixture of ceramic powder and binder material by injecting the mixture into hardened metal dies. After removal from the dies, the green cores may then be thermally post-processed to remove the binder and fired to sinter the ceramic powder together. The trend toward finer cooling features has taxed ceramic core manufacturing techniques. The cores defining fine features may be difficult to manufacture and/or, once manufactured, may prove fragile.

A variety of post-casting techniques were traditionally used to form the fine features. A most basic technique is conventional drilling. Laser drilling is another. Electrical discharge machining or electro-discharge machining (EDM) has also been applied. For example, in machining a row of cooling holes, it is known to use an EDM electrode of a comb-like shape with teeth having complementary shape to the holes to be formed. Various EDM techniques, electrodes, and hole shapes are shown in U.S. Pat. No. 3,604,884 of Olsson, U.S. Pat. No. 4,197,443 of Sidenstick, U.S. Pat. No. 4,819,325 of Cross et al., U.S. Pat. No. 4,922,076 of Cross et al., U.S. Pat. No. 5,382,133 of Moore et al., U.S. Pat. No. 5,605,639 of Banks et al., and U.S. Pat. No. 5,637,239 of Adamski et al. The hole shapes produced by such EDM techniques are limited by electrode insertion constraints.

Commonly-assigned U.S. Pat. No. 6,637,500 of Shah et al. discloses exemplary use of a ceramic and refractory metal core combination. With such combinations, generally, the ceramic core(s) provide the large internal features such as trunk passageways while the refractory metal core(s) provide finer features such as outlet passageways. As is the case with the use of multiple ceramic cores, assembling the ceramic and refractory metal cores and maintaining their spatial relationship during wax overmolding presents numerous difficulties. A failure to maintain such relationship can produce potentially unsatisfactory part internal features. It may be difficult to assemble fine refractory metal cores to ceramic cores. Once assembled, it may be difficult to maintain alignment. The refractory metal cores may become damaged during handling or during assembly of the overmolding die. Assuring proper die assembly and release of the injected pattern may require die complexity (e.g., a large number of separate die parts and separate pull directions to accommodate the various RMCs).

Separately from the development of RMCs, various techniques for positioning the ceramic cores in the pattern molds and resulting shells have been developed. U.S. Pat. No. 5,296,308 of Caccavale et al. discloses use of small projections unitarily formed with the feed portions of the ceramic core to position a ceramic core in the die for overmolding the pattern wax. Such projections may then tend to maintain alignment of the core within the shell after shelling and dewaxing.

Commonly assigned U.S. patent application Ser. No. 10/891,660, filed Jul. 14, 2004, and entitled "INVESTMENT CASTING" discloses use of comb-like RMCs to position a ceramic core. The RMC may have tapering tines flexed to bias the ceramic core toward the desired position. The disclosure of this '660 application is incorporated by reference as if set forth at length.

Nevertheless, there remains room for further improvement in core assembly techniques.

SUMMARY OF THE INVENTION

One aspect of the invention involves a method for forming an investment casting pattern. A first core is installed to a first element of a molding die to leave a first portion of the first core protruding from the first element. After the installing, the first element is assembled with a feed core and a second element of the molding die so that the first portion contacts the feed core. A material is molded at least partially over the first core and the feed core. The first portion has one or more surface area enhancements.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
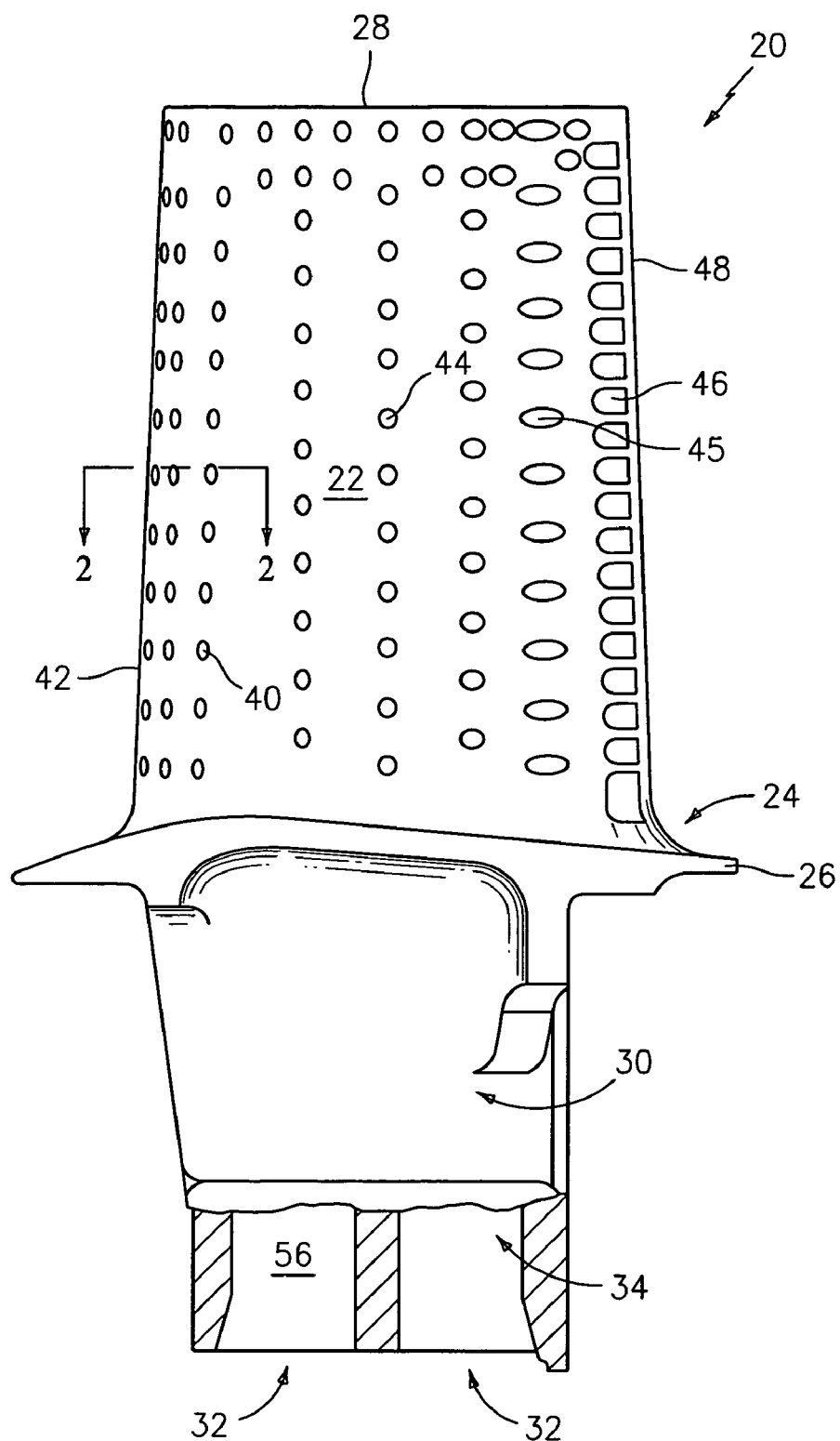
FIG. 1 is a partially cutaway view of a turbine blade.

FIG. 1 shows an exemplary turbine element in the form of a blade 20. The blade has an airfoil 22 extending from a root 24 at a platform 26 to a tip 28. A blade attachment root 30 depends from the platform 26 and includes an exemplary pair of inlet ports 32 to a cooling passageway network 34 within the blade. The network 34 extends to a number of outlets located on the surface of the airfoil. Exemplary outlets include arrays of outlets 40 near an airfoil leading edge 42. Additional outlets 44, 45, and 46 are arrayed downstream toward the trailing edge 48.

Figure 2:
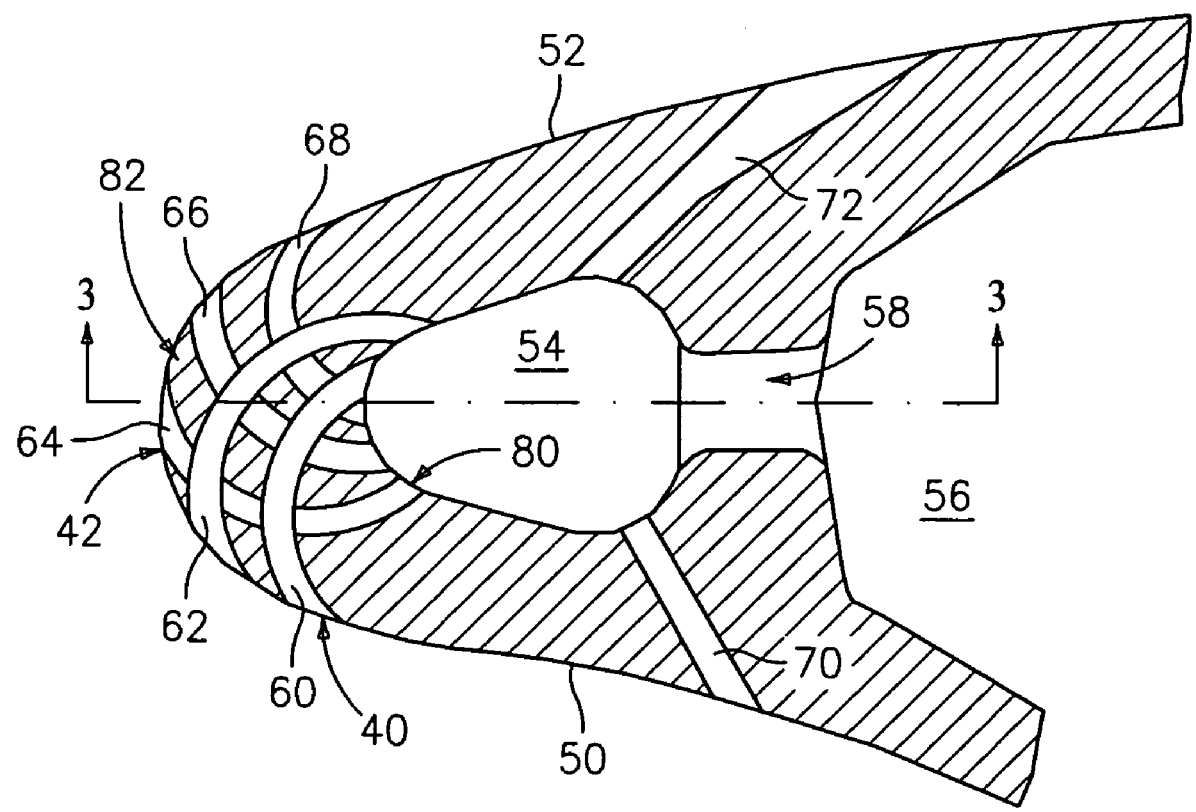
FIG. 2 is a partial sectional view of an airfoil of the blade of FIG. 1, taken along line 2-2.
Figure 3:
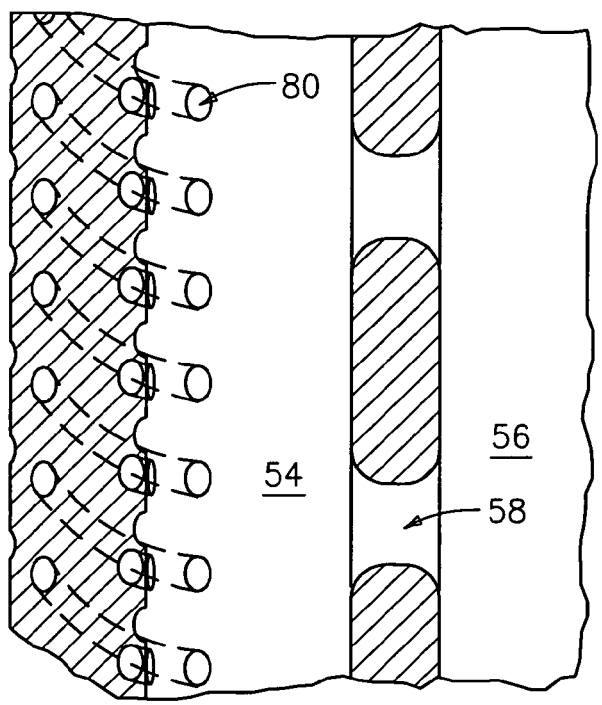
FIG. 3 is a partial sectional view of an airfoil of FIG. 2, taken along line 3-3.

FIG. 2 shows the airfoil 22 as including pressure and suction side surfaces 50 and 52. FIG. 2 further shows a leading leg 54 of the passageway network and a second leg 56. In the exemplary airflow, the second leg 56 feeds cooling air to the leading leg 54 via connecting impingement passageways 58. The leading leg 54 (an impingement cavity), in turn, feeds a number of discharge/outlet passageways 60, 62, 64, 66, 68, 70, and 72. In the exemplary airflow, there are spanwise groups of each of these discharge passageways. For ease of illustration, these discharge passageways are all shown in elevation although each has an at-most partial intersection with the cut/view plane. These discharge passageways extend to outlets on the airfoil surface (e.g., the outlets 40 for the discharge passageways 60-68). Each of the discharge passageways 60-68 includes an inlet 80 at the leading leg 54. For enhanced cooling of the tip region 82, the passageways 60-68 spiral (FIG. 3), thereby increasing the length per passageway and decreasing the maximum spacing between passageways (e.g., relative to a similar number of similar cross-section straight passageways). Such spiraling is shown in U.S. Pat. No. 5,486,093.

Figure 4:
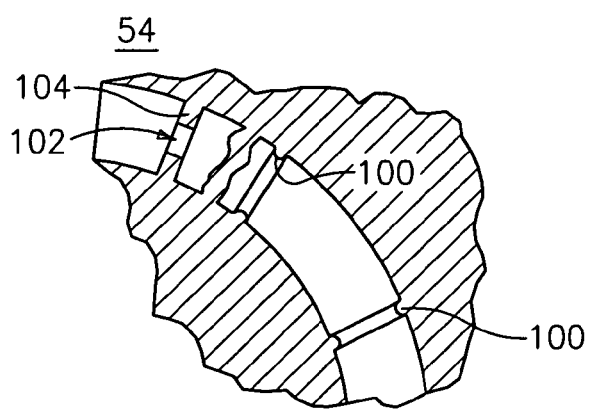
FIG. 4 is a sectional view of a first discharge/outlet passageway of the airfoil of FIG. 2.
Figure 5:
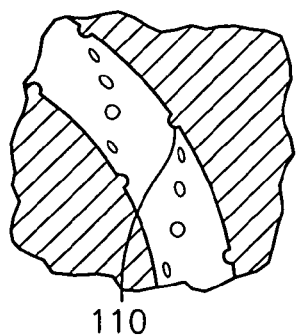
FIG. 5 is a sectional view of a second discharge/outlet passageway of the airfoil of FIG. 2.
Figure 6:
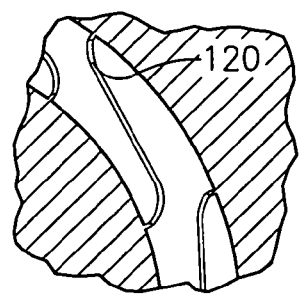
FIG. 6 is a sectional view of a third discharge/outlet passageway of the airfoil of FIG. 2.

The exemplary passageways 60-68 have generally circular cross-sections provided with a longitudinally-varying surface enhancement. FIG. 4 shows an exemplary enhancement in the form of circumscribing annular protrusions 100. These protrusions 100 may function to disturb the laminar flow in the passage and increase the heat transfer between the airfoil and the cooling air. FIG. 4 further shows a flow metering orifice 102 defined by a relatively large annular protrusion 104. The orifice 102 may be sized to provide a desired flow through the associated outlet passageway (e.g., less than 50% of the cross-sectional area of adjacent portions of the passageway and, more narrowly, 10-30%). The exemplary orifice 102 is relatively upstream (i.e., near to the passageway leg 54). FIG. 5 shows an alternate enhancement in the form of one or more spiral arrays of bumps 110 (e.g., hemispherical bumps) although other shapes may also be employed. Such bumps may provide enhanced heat transfer and turbulence generation. FIG. 6 shows another alternate enhancement in the form of one or more spiral protrusions or ribs 120. The spiral ribs are flow disturbers and also flow guides to produce spiral flow in the cooling air along the direction of the outlet passageway.

The various cooling enhancement means may be used singularly or in combination. The ability to easily form these small diameter curved holes provides for added heat extraction from the airfoil wall through an increase in convective length of the outlet passageway.

Figure 7:
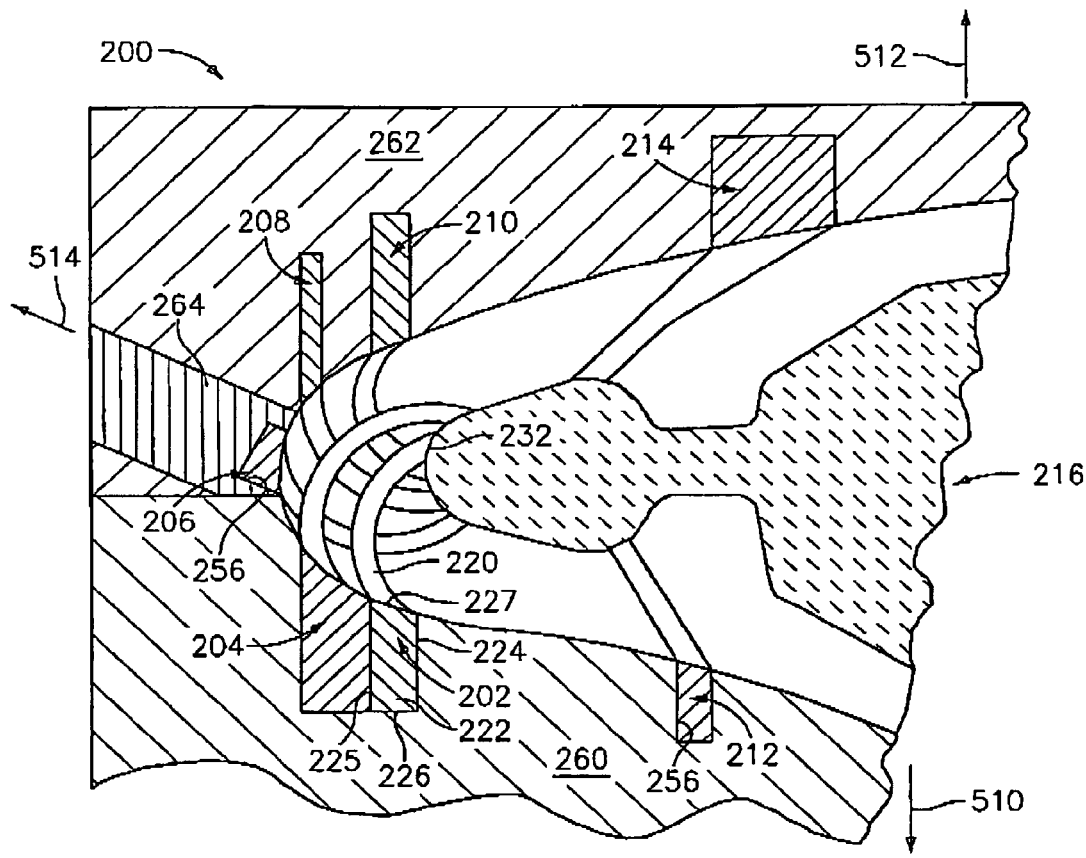
FIG. 7 is a sectional view of a pattern-forming die.

The outlet passageways are advantageously formed during casting of the blade. The outlet passageways may be formed over sacrificial casting cores. FIG. 7 shows a die 200 for molding wax over an assembly of investment casting cores 202, 204, 206, 208, 210, 212, 214, and 216 (additional cores not shown) The exemplary cores 202-214 are refractory metal cores (RMCs) whereas the exemplary core 216 is a molded ceramic feed core. The feed core 216 has portions for forming the legs of the passageway network 34. The RMCs have tines 220 for forming the discharge passageways. The exemplary RMCs may include a refractory metal substrate and, optionally, a coating (e.g., ceramic). Exemplary RMC substrate materials include Mo, Nb, Ta, and W alone or in combination and in elemental form, alloy, intermetallic, and the like. The exemplary RMCs maybe comb-like, having a back or spine 222 from which a row of the tines 220 extend. The spine may have spring biasing tabs as disclosed in the '660application. Other forms are possible. An exemplary spine may provide at least 90% of a mass of the RMC.

Figure 8:
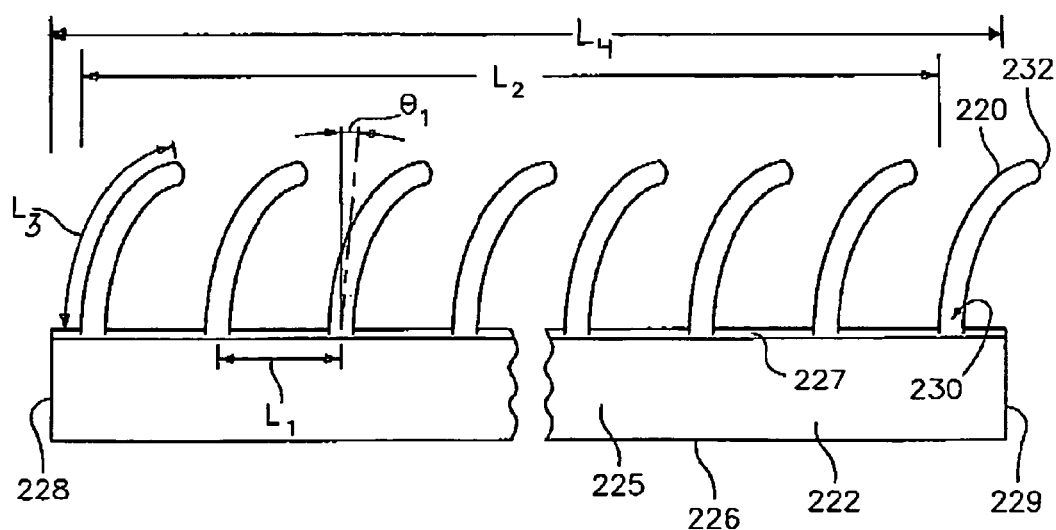
FIG. 8 is a view of a refractory metal core for use in the die of FIG. 7.

The exemplary spines 222 have first and second faces 224 and 225 and inboard and outboard ends 226 and 227. The spines 222 have first and second lateral ends 228 and 229 (FIG. 8). The tines 220 extend from roots 230 at the spine inboard end 227 to tips 232. In some embodiments, the tines may have a taper (e.g., from relatively wide cross-section at the proximal roots 230 at least to a relatively small cross-section intermediate location). With such a taper over a first region, the tines may be less tapered over a second region, distally of the first region. As is discussed below, a surface enhancement may be located along at least the second region. The exemplary tines are shown as non-interesting.

Figure 9:
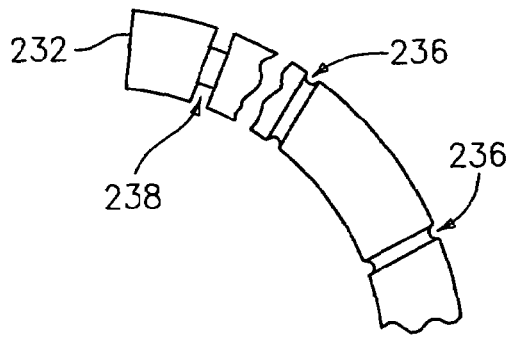
FIG. 9 is a partial view of a refractory metal core tine for forming the passageway of FIG. 4.
Figure 10:
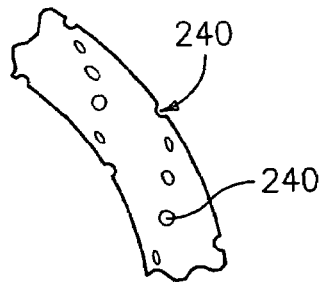
FIG. 10 is a partial view of a refractory metal core tine for forming the passageway of FIG. 5.
Figure 11:
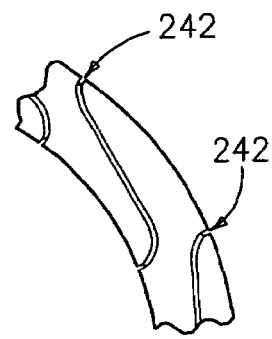
FIG. 11 is a partial view of a refractory metal core tine for forming the passageway of FIG. 6.

FIG. 9 shows a tine having annular recesses 236 for casting the protrusions 100 of FIG. 4. The tine further includes a deeper annular recess 238 for casting the metering protrusion 104 and leaving the associated metering orifice 102. FIG. 10 shows a tine having recesses 240 for forming the bumps 110 of FIG. 5. FIG. 11 shows a tine having spiral recesses 242 for forming the protrusions 120 of FIG. 6.

In the exemplary RMC of FIG. 8, a tine-to-tine pitch $L_1$ may be defined as the on-center spacing/separation of adjacent tines (e.g., at their roots). The pitch may be constant or varied as may be the length and cross-sectional shape and dimensions of the tines. For example, these parameters may be varied to provide a desired cooling distribution. The array of tines has an overall length $L_2$. Each tine has an overall length $L_3$. An overall spine length is $L_4$. These parameters may be chosen to permit a desired tooth/hole distribution in view of economy factors (e.g., it may be more economical in labor savings to have one RMC with many tines rather than a number of RMCs each with a lesser number of tines). An exemplary tine count is 15-40, more broadly at least six, alternatively 3-40.

In the exemplary RMC, proximal portions of the tines are at an angle $\theta_1$ (FIG. 8) relative to an adjacent surface of the RMC. $\theta_1$, $L_3$, the tines orientation, and the tine spiral characteristic need not be the same for each tine. For example, the tines may be at a non-constant spacing and/or one or more of the tines may extend off-parallel to each other.

Exemplary overall tine lengths are 0.5-13 mm, more narrowly 3.0-7.0 mm, depending essentially upon the wall thickness of the part and the overall tine angle relative to the part outer surface. Exemplary cross-sectional areas of the passageways are 0.03-0.8 $mm^2$. Exemplary maximum transverse dimensions of the tines are 0.2-1.0 mm.

FIG. 7 shows the RMCs positioned with their spines 222 in compartments 256 formed in the main elements 260 and 262 of the die or formed in one or more inserts or slides 264. The tines extend so that their tips 232 contact the feed core 216. The tines may be slightly resiliently flexed during the die assembly process to help position the feed core either during wax molding or later stages. In an exemplary implementation, the elements 260 and 262 are, respectively, pressure side and suction side elements. The compartments 256 may be shaped and dimensioned to precisely orient and position the associated spines 222. In the exemplary implementation, the spines 222 (e.g., by their faces 224 and 225) may define a direction of insertion for inserting the spine into a die. The tines may extend off-parallel to the first and second faces of the spine and to that direction of insertion. The exemplary die elements may be formed of metal or a composite (e.g., epoxy-based). The die elements are shown assembled. The die elements may have passageways for the introduction of wax (e.g., material comprising in major weight part one or more waxes) to a molding chamber surrounding the core assembly.

The exemplary slide 264 is positioned in a compartment in the suction side die element 262. The slide 264 may be retracted to release a backlocking effect between the associated core 206 and the main element 262, allowing release of the wax pattern. The die elements may be separable by pulling in respective directions 510 and 512 after the slide 264 has been retracted in a direction 514 The directions 510, 512, and 514 may correspond to an inclination of the spine(s) of the associated RMC(s). In die assembly, the spines are placed into the compartments 256 before the die elements are closed. When closed the die forms a cavity into which wax is injected to form the positive which represents the airfoil to be cast. Once the wax is solidified the die elements are separated to extract the wax pattern. The tines remain embedded in the wax. To prevent damage to the wax pattern the spine compartments 256 may be parallel to the pull plane or direction of the associated die element.

Figure 12:
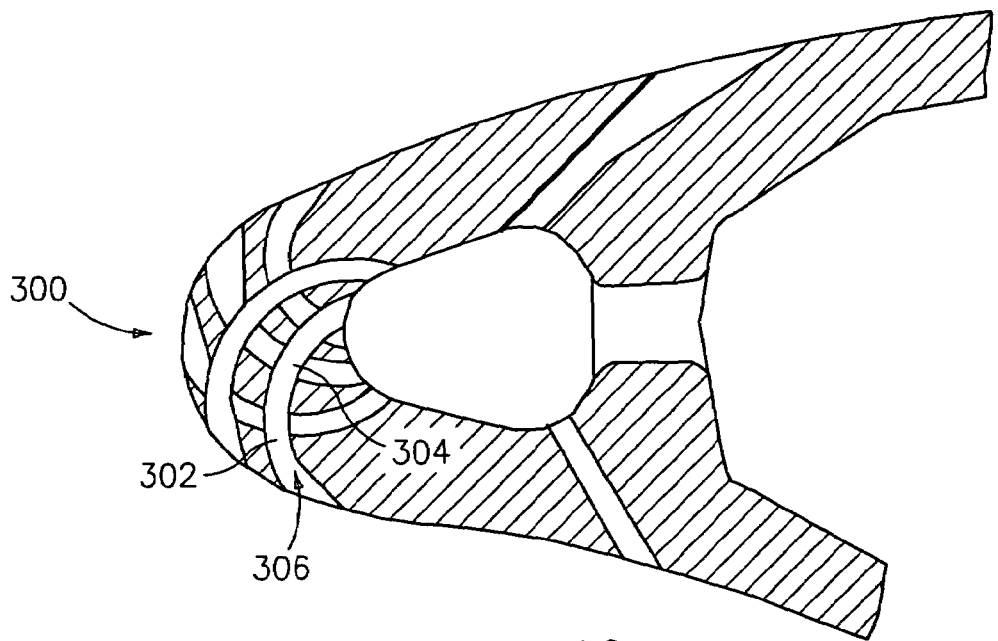
FIG. 12 is a sectional view of an alternate airfoil.

FIG. 12 shows an airfoil 300 wherein the discharge/outlet passageways 302 have an upstream portion 304 of generally constant cross-section (subject to the surface area enhancements). The passageways 302 have downstream portions 306 whose cross-sections are downstream divergent. These downstream portions 306 may also have the surface area enhancements or may not. These downstream portions act as diffusers.

The RMCs may be formed by any of a variety of manufacturing techniques, for example, those used to form EDM comb electrodes. For example, the substrate may be formed by milling from a refractory metal ingot or stamping and bending a refractory metal sheet, or by build up using multiple sheets. Other cutting and machining techniques include laser cutting, water jet cutting, electrochemical machining and electrical discharge machining. The tine surface enhancements may also be formed by a variety of techniques. Exemplary techniques include laser etching, grit blasting, electrical discharge machining, and photomasked chemical milling. For ease and precision, these enhancements may be formed during an intermediate stage. For example, the basic comb-like form of the RMC may be stamped. then the enhancements added to the tines, and then the tines curled to the desired spiral form.

The substrate may then be coated (e.g., with a full ceramic coating or a coating limited to areas that will ultimately contact molten metal). The exemplary RMC's are intended to be illustrative of one possible general configuration. Other configurations, including simpler and more complex configurations are possible. A core precursor could be manufactured having a spine and tines and individual cores separated from the precursor, with the individual cores each having one or more of the tines. Individual cores with one to a few tines could be useful, for example, where only isolated holes or small groups thereof are desired or where it is desired that the holes be of varying shape/size, staggered out of line, of varying spacing, and the like.

The foregoing teachings may be implemented in the manufacturing of pre-existing patterns (core combinations and wax shapes) or to produce novel patterns not yet designed.

One or more embodiments of the present invention have been described. Nevertheless, it will be understood that various modifications may be made without departing from the spirit and scope of the invention. For example, details of the particular components being manufactured will influence or dictate details of any particular implementation. Thus, other core combinations may be used, including small and/or finely-featured ceramic or other cores in place of the RMCs. Dies having more than two parts may be used. Accordingly, other embodiments are within the scope of the following claims.

What is claimed is:

1. A method comprising:
forming an investment casting core precursor having a spine and a plurality of tine precursors; and
after forming the tine precursors, forming a plurality of surface enhancement recesses in the tine precursors.

2. The method of claim 1 further comprising:
deforming the tine precursors to at least partially spiral.

3. The method of claim 1 wherein:
the forming the investment casting core precursor comprises at least one of:
stamping;
laser cutting;
water jet cutting;
electro-chemical machining; and
electrical discharge machining.

4. The method of claim 1 wherein:
the forming the plurality of surface enhancements comprises at least one of:
laser etching;
grit blasting;
photomasked chemical etching; and
electrical discharge machining.

5. A method for forming an investment casting pattern comprising:
forming at least one first core, the forming including:
forming an investment casting core precursor having a plurality of tine precursors; and
after forming the tine precursors, forming a plurality of surface enhancement recesses in the tine precursors;

installing the first core to a first element of a molding die to leave tines of the first core protruding from the first element;

after said installing, assembling the first element with a feed core and a second element of said molding die so that said tines contact the feed core; and molding of a material at least partially over the first core and feed core.

6. The method of claim 5 wherein:

the assembling provides engagement between the first core and feed core to at least partially maintain an orientation of the feed core relative to the molding die.

7. The method of claim 5 farther comprising:

installing a second core to the second element to leave tines of the second core protruding from the second element.

8. The method of claim 5 wherein:

said first core comprises, in major weight part, one or more refractory metals; and said feed core comprises, in major weight part, one or more ceramic materials.

9. The method of claim 5 wherein:

the material comprises, in major weight part, one or more waxes.

10. A method for forming an investment casting mold comprising:

forming an investment casting pattern as in claim 5;

applying one or more coating layers to said pattern; and substantially removing the material to leave the first core and feed core within a shell formed by the coating layers.

11. The method of claim 10 used to fabricate a gas turbine engine airfoil element mold.

12. A method for investment casting comprising:

forming an investment casting mold as in claim 10;

introducing molten metal to the investment casting mold;

permitting the molten metal to solidify; and destructively removing the investment casting mold.

13. The method of claim 12 used to fabricate a gas turbine engine component.

14. The method of claim 5 wherein:

the forming the plurality of surface enhancements comprises at least one of:

laser etching;

grit blasting;

photomasked chemical etching; and electrical discharge machining.

* * * * *

UNITED STATES PATENT AND TRADEMARK OFFICE
CERTIFICATE OF CORRECTION

PATENT NO. : 7,306,026 B2  Page 1 of 1
APPLICATION NO. : 11/219149
DATED : December 11, 2007
INVENTOR(S) : Robert L. Memmen It is certified that error appears in the above-identified patent and that said Letters Patent is hereby corrected as shown below:

Column 7, claim 7, line 13, "farther" should read --further--.

Signed and Sealed this

Thirteenth Day of May, 2008

JON W. DUDAS
*Director of the United States Patent and Trademark Office*